(12) United States Patent
Jiang et al.

(10) Patent No.: US 7,177,117 B1
(45) Date of Patent: Feb. 13, 2007

(54) MAGNETICALLY SOFT, HIGH SATURATION MAGNETIZATION LAMINATES OF IRON-COBALT-NITROGEN AND IRON-NICKEL FOR MAGNETIC HEAD POLE LAYERS

(75) Inventors: Hai Jiang, Fremont, CA (US); Kyusik Sin, Pleasanton, CA (US); Yingjian Chen, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 507 days.

(21) Appl. No.: 10/853,416

(22) Filed: May 24, 2004

Related U.S. Application Data

(63) Continuation-in-part of application No. 10/137,030, filed on May 1, 2002, now Pat. No. 6,778,358.

(51) Int. Cl.
*G11B 5/147* (2006.01)

(52) U.S. Cl. .................................. 360/126; 428/611
(58) Field of Classification Search ............... None
See application file for complete search history.

(56) References Cited

U.S. PATENT DOCUMENTS

| | | | |
|---|---|---|---|
| 4,589,042 A | 5/1986 | Anderson et al. | |
| 5,606,478 A | 2/1997 | Chen et al. | |
| 5,874,010 A | 2/1999 | Tao et al. | |
| 6,353,511 B1 * | 3/2002 | Shi et al. | 360/126 |
| 6,641,935 B1 | 11/2003 | Li et al. | |
| 6,645,647 B1 | 11/2003 | Litvinov et al. | |
| 6,646,827 B1 | 11/2003 | Khizroev et al. | |
| 6,667,118 B1 | 12/2003 | Chang et al. | |
| 6,713,197 B2 | 3/2004 | Nakamura et al. | |
| 6,714,380 B2 * | 3/2004 | Kawasaki et al. | 428/815.2 |
| 6,773,556 B1 | 8/2004 | Brockie et al. | |
| 6,777,066 B1 | 8/2004 | Chang et al. | |
| 6,778,358 B1 | 8/2004 | Jiang et al. | |
| 6,805,966 B1 | 10/2004 | Formato et al. | |
| 6,815,082 B2 | 11/2004 | Girt | |
| 6,835,475 B2 | 12/2004 | Carey et al. | |

(Continued)

OTHER PUBLICATIONS

S. Wang, et al., Improved high moment FeAlN/SiO2 laminated materials for thin film recording heads, IEEE Trans. Magn. vol. 27, pp. 4879-4881 (Nov. 1991).

(Continued)

*Primary Examiner*—Brian E. Miller
(74) *Attorney, Agent, or Firm*—Mark A. Lauer, Esq.

(57) ABSTRACT

A magnetic head comprising a first layer containing NiFe having a concentration of iron that is at least thirty percent and not more than seventy percent; a second layer that adjoins the first layer and contains FeCoN having a concentration of iron that is greater than the second layer's concentration of cobalt, having a concentration of nitrogen that is less than the second layer's concentration of cobalt and less than three percent; and a third layer containing FeCoNi having a concentration of nickel that is less than eight percent, having a concentration of cobalt that is less than the third layer's concentration of iron and greater than the third layer's concentration of nickel, the third layer adjoining only one of the first and second layers. The first and second layers may be repeated to form a magnetically soft high $B_S$ laminate for a pole layer.

45 Claims, 4 Drawing Sheets

U.S. PATENT DOCUMENTS

| | | | |
|---|---|---|---|
| 6,844,724 B1 | 1/2005 | Peng et al. | |
| 6,970,324 B2 * | 11/2005 | Ikeda et al. | 360/126 |
| 2001/0008712 A1 * | 7/2001 | Yazawa et al. | 428/692 |
| 2002/0008936 A1 * | 1/2002 | Kawasaki et al. | 360/126 |
| 2003/0197988 A1 * | 10/2003 | Hasegawa et al. | 360/324.12 |
| 2005/0011590 A1 * | 1/2005 | Kawasaki et al. | 148/311 |

OTHER PUBLICATIONS

B.D. Cullity, Introduction to Magnetic Materials pp. 148, Addison-Wesley, 1972.

Viala, B., et al., "Microstructure and Magnetism in FeTaN Films Deposited in the Nanocrystalline State", Journal of Applied Physics, 80(7), pp. 3941-3956, Oct. 1996.

Sun, N.X., et al., "Microstructure and Soft Magnetic Properties of High Saturation Magnetization Fe-Co-N alloy Thin Films", Materials Research Society Symposium, vol. 614, pp. F9.2.1-F9.2.12, 2000.

Nakagawa, S. et al., "Improvement of soft magnetism of Fe90C010 sputtered films by addition of N and Ta", Journal of Applied Physics, 79(8), pp. 5156-5158, Apr. 1996.

* cited by examiner

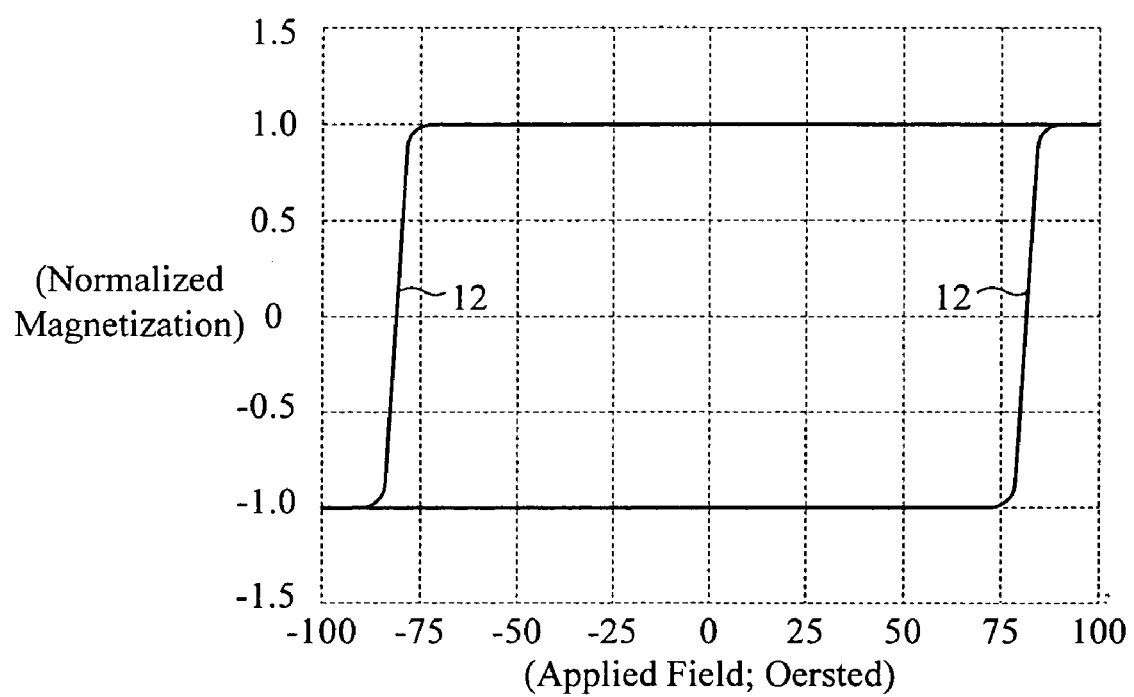
FIG. 8 *(Prior Art)*

MAGNETICALLY SOFT, HIGH SATURATION MAGNETIZATION LAMINATES OF IRON-COBALT-NITROGEN AND IRON-NICKEL FOR MAGNETIC HEAD POLE LAYERS

CROSS-REFERENCE TO RELATED APPLICATION

The present application claims the benefit under 35 U.S.C. 120 (is a continuation-in-part) of U.S. patent application Ser. No. 10/137,030, filed May 1, 2002, now U.S. Pat. No. 6,778,358 which is incorporated by reference herein. Also incorporated by reference is the concurrently filed application by the same inventors, entitled: MAGNETICALLY SOFT, HIGH SATURATION MAGNETIZATION LAMINATE OF IRON-COBALT-NITROGEN AND IRON-NICKEL FOR PERPENDICULAR MEDIA UNDERLAYERS.

TECHNICAL FIELD

The present invention relates to magnetic devices, for example electromagnetic transducers such as magnetic heads of disk or tape drives.

BACKGROUND

Electromagnetic transducers such as heads for disk or tape drives commonly include Permalloy (approximately $Ni_{0.81}Fe_{0.19}$), which is formed in thin layers to create magnetic features. Permalloy is known to be magnetically "soft," that is, to have high permeability and low coercivity, allowing structures made of Permalloy to act like good conductors of magnetic flux. For example, an inductive head may have conductive coils that induce magnetic flux in an adjacent Permalloy core, that flux employed to magnetize a portion or bit of an adjacent media. That same inductive head may read signals from the media by bringing the core near the magnetized media portion so that the flux from the media portion induces a flux in the core, the changing flux in the core inducing an electric current in the coils. Alternatively, instead of inductively sensing media fields, magnetoresistive (MR) sensors or merged heads that include MR or giant magnetoresistive (GMR) sensors may use thinner layers of Permalloy to read signals, by sensing a change in electrical resistance of the sensor that is caused by the magnetic signal.

In order to store more information in smaller spaces, transducer elements have decreased in size for many years. One difficulty with this deceased size is that the amount of flux that needs to be transmitted may saturate elements such as magnetic pole layers, which becomes particularly troublesome when ends of the pole layers closest to the media, commonly termed pole tips, are saturated. Magnetic saturation in this case limits the amount of flux that is transmitted through the pole tips, limiting writing or reading of signals. Moreover, such saturation may blur that writing or reading, as the flux may be evenly dispersed over an entire pole tip instead of being focused in a corner that has relatively high flux density. For these reasons the use of high magnetic saturation materials (also known as high moment or high $B_S$ materials) in magnetic core elements has been known for many years.

For instance, iron is known to have a higher magnetic moment than nickel, so increasing the proportion of iron compared to nickel generally yields a higher moment alloy. Iron, however, is also more corrosive than nickel, which imposes a limit to the concentration of iron that is feasible for many applications. Also, it is difficult to achieve soft magnetic properties for primarily-iron NiFe compared to primarily-nickel NiFe. Anderson et al., in U.S. Pat. No. 4,589,042, teach the use of high moment $Ni_{0.45}Fe_{0.55}$ for pole tips. Anderson et al. do not use $Ni_{0.45}Fe_{0.55}$ throughout the core due to problems with permeability of that material, which Anderson et al. suggest is due to relatively high magnetostriction of $Ni_{0.45}Fe_{0.55}$.

As noted in U.S. Pat. No. 5,606,478 to Chen et al., the use of high moment materials has also been proposed for layers of magnetic cores located closest to a gap region separating the cores. Also noted by Chen et al. are some of the difficulties presented by these high moment materials, including challenges in forming desired elements and corrosion of the elements once formed. Chen et al. state that magnetostriction is another problem with $Ni_{0.45}Fe_{0.55}$, and teach the importance of constructing of heads having Permalloy material layers that counteract the effects of that magnetostriction. This balancing of positive and negative magnetostriction with plural NiFe alloys is also described in U.S. Pat. No. 5,874,010 to Tao et al.

Primarily iron FeCo alloys are known to have a very high saturation magnetization but also high magnetostriction that makes them unsuitable for many head applications. That is, mechanical stress during slider fabrication or use may perturb desirable magnetic domain patterns of the head. FIG. 8 shows a B/H loop 12 of a FeCoN layer that was formed by sputtering deposition at room temperature, the layer having a thickness of approximately 500 Å and having a composition of approximately $Fe_{0.66}Co_{0.28}N_{0.06}$. The applied H-field is shown in oersted (Oe) across the horizontal axis while the magnetization of the layer is plotted in normalized units along the vertical axis, with unity defined as the saturation magnetization for a given material. The FeCoN layer has a saturation magnetization ($B_S$) of approximately 24.0 kilogauss and is magnetically isotropic, as shown by the single B/H loop 12. B/H loop 12 also indicates a relatively high coercivity of about 80 oersted, which may be unsuitable for applications requiring soft magnetic properties.

In an article entitled "Microstructures and Soft Magnetic Properties of High Saturation Magnetization Fe—Co—N alloy Thin Films," Materials Research Society, Spring meeting, Section F, April 2000, N. X. Sun et al. report the formation of FeCoN films having high magnetic saturation but also high magnetostriction and moderate coercivity. Sun et al. also report the formation of a thin film structure in which FeCoN is grown on and capped by Permalloy, to create a sandwich structure having reduced coercivity but compressive stress. The magnetostriction of this sandwich structure, while somewhat less than that of the single film of FeCoN, may still be problematic for head applications.

SUMMARY

In one embodiment, a magnetic head is disclosed, comprising a first layer containing NiFe having an atomic concentration of iron that is at least thirty percent and not more than seventy percent; a second layer that adjoins the first layer and contains FeCoN having an atomic concentration of iron that is greater than the second layer's atomic concentration of cobalt, having an atomic concentration of nitrogen that is less than the second layer's atomic concentration of cobalt and less than three percent; and a third layer containing FeCoNi having an atomic concentration of nickel that is less than eight percent, having an atomic concentration of cobalt that is less than the third layer's atomic concentration of iron and greater than the third layer's atomic concentration of nickel, the third layer adjoining only one of the first and second layers.

The magnetic head may include a first plurality of layers each containing NiFe having an atomic concentration of iron that is at least about thirty percent; a second plurality of layers that is interleaved with the first plurality of layers, the second plurality of layers each containing FeCoN having an atomic concentration of iron that is greater than an atomic concentration of cobalt, and having an atomic concentration of nitrogen that is less than the atomic concentration of cobalt, the atomic concentration of nitrogen being less than eight percent; and a layer containing FeCoNi that adjoins one of the layers containing NiFe or one of the layers containing FeCoN.

BRIEF DESCRIPTION OF THE DRAWINGS

FIG. 8 is plot of a B/H loop of a prior art FeCoN layer.

DETAILED DESCRIPTION OF THE PREFERRED EMBODIMENT

Figure 1:
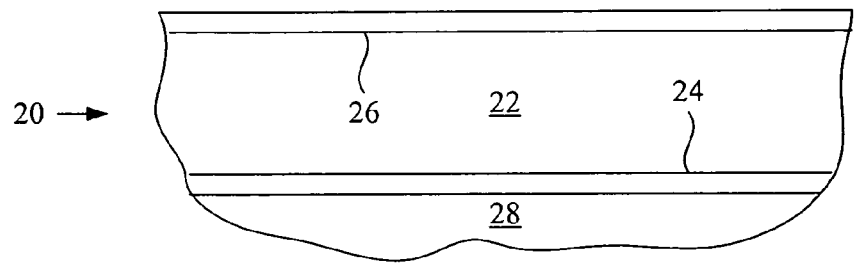
FIG. 1 is a cutaway cross-sectional view of a sandwich structure made of a primarily iron FeCoN layer affixed between a pair of FeNi layers.

FIG. 1 is a cutaway cross-sectional view of a sandwich structure 20 made of an iron-cobalt-nitride (FeCoN) layer 22 affixed between a pair of iron—nickel (FeNi) layers 24 and 26. The sandwich structure 20 is formed on a substrate 28 that provides a smooth surface promoting favorable crystallographic growth of layers 22, 24 and 26. The FeCoN layer 22 has a thickness of approximately 475 Å and has a composition of approximately $Fe_{0.69}Co_{0.30}N_{0.01}$. The FeNi layers 24 and 26 each have a thickness of approximately 25 Å and have a composition of approximately $Ni_{0.55}Fe_{0.45}$. Layers 22, 24 and 26 were formed by DC magnetron sputtering deposition at room temperature. Magnetron sputtering has a deposition rate that is approximately ten times faster than that of RF sputtering, which is an advantage in commercial applications such as magnetic head production. The substrate may be a silicon dioxide, alumina, chromium, tantalum or titanium, for example.

Figure 2:
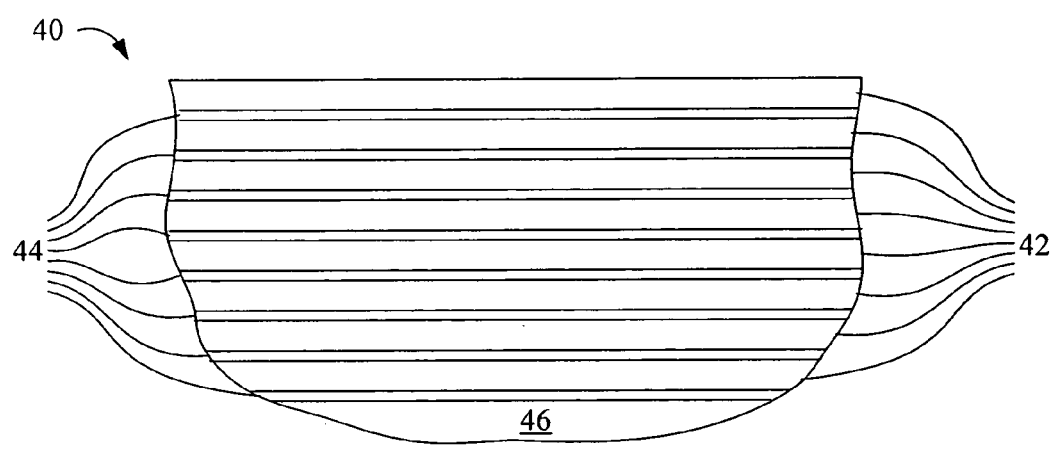
FIG. 2 is a cutaway cross-sectional view of a laminated structure made of a plurality of primarily iron FeCoN layers interleaved with a plurality of primarily iron FeNi layers.

FIG. 2 is a cutaway cross-sectional view of a laminated structure 40 made of a plurality of primarily iron FeCoN layers 42 interleaved with a plurality of primarily iron FeNi layers 44. The sandwich structure 20 is formed on a substrate 46 that provides a surface promoting favorable microstructural growth of layers 42 and 44. The FeCoN layers 42 each have a thickness of approximately 475 Å and a composition of approximately $Fe_{0.69}Co_{0.30}N_{0.01}$. The FeNi layers 42 each have a thickness of approximately 25 Å and have a composition of approximately $Ni_{0.55}Fe_{0.45}$. Layers 42 and 44 were formed by magnetron sputtering deposition on substrate 46 at room temperature. Various other compositions and thicknesses may also be suitable. For example, the FeCoN layers may have atomic concentrations of iron in a range between 50% and 80%, atomic concentrations of cobalt in a range between 17% and 50%, and atomic concentrations of nitrogen in a range between 0.01% and 3%. As another example, the NiFe layers may have atomic concentrations of iron in a range between 30% and 70%, and atomic concentrations of nickel in a range between 70% and 30%. The thickness of any of the layers may for example be in a range between a few angstroms and one hundred nanometers.

Figure 3:
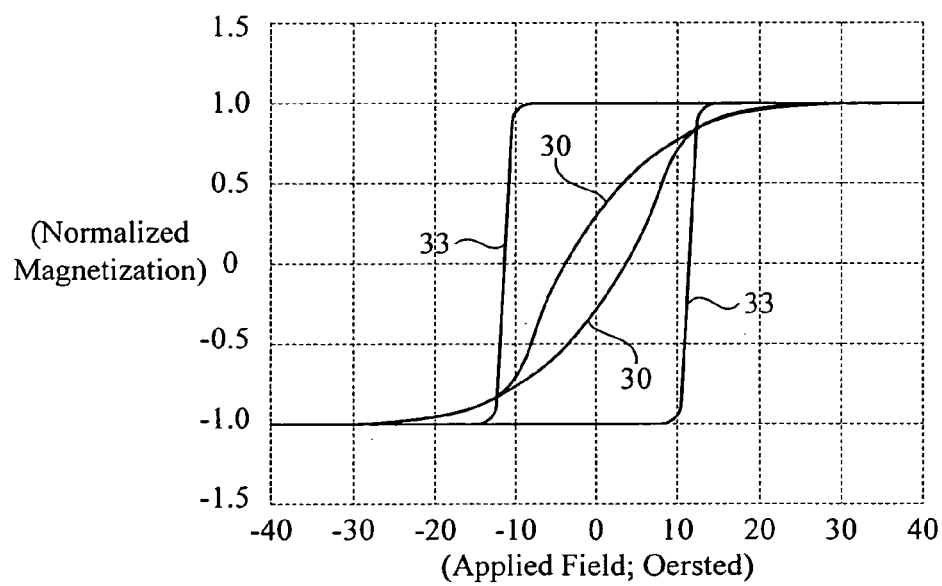
FIG. 3 is plot of a B/H loop of the laminated structure of FIG. 2.

FIG. 3 shows B/H loops 30 and 33 for the laminated structure 40 of FIG. 2 having an overall thickness of about 2500 Å. The laminated structure has a saturation magnetization ($B_S$) of approximately 2.4 tesla (T), nearly that of the single layer of FeCoN. The coercivity of the hard axis, which is defined as the applied field of the loop 30 at which the magnetization is zero, is about 4 oersted (Oe) while the coercivity of the easy axis is about 12 Oe as shown by loop 33. The permeability is approximately 2000, and the laminate has been found to be suitable for applications such as pole layers for magnetic heads.

Figure 4:
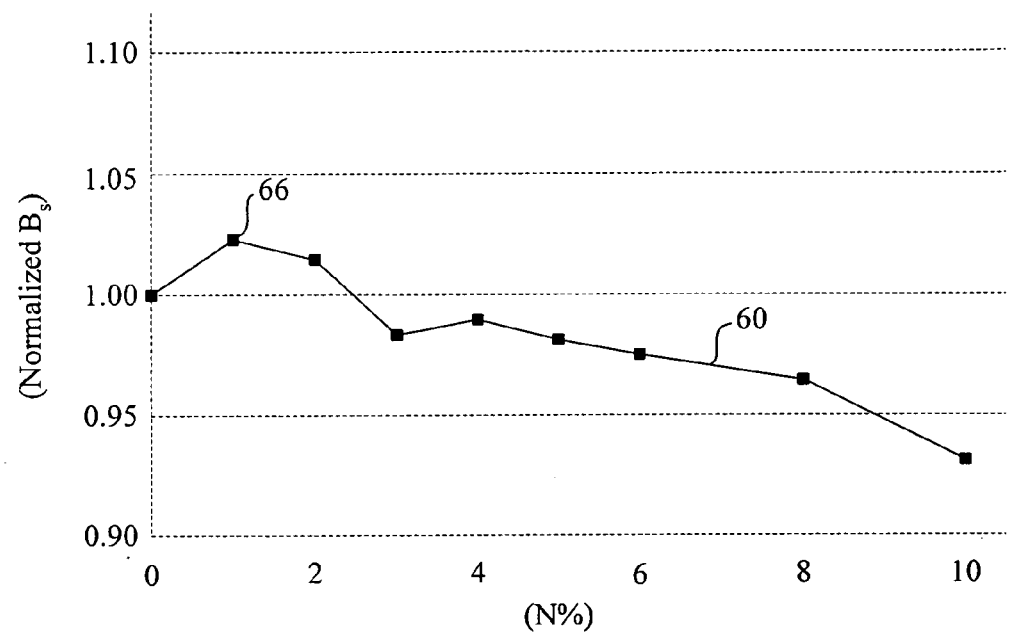
FIG. 4 is a plot of saturation magnetization as a function of nitrogen gas content for $(Fe_{0.70}Co_{0.30})N$.

FIG. 4 is a plot 60 of experimentally determined saturation magnetization $B_S$ of FeCoN for various concentrations of nitrogen gas, normalized for zero nitrogen. The plot 60 was generated using a sputtering target of $Fe_{0.70}Co_{0.30}$ and varying the amount of nitrogen gas. The concentration of nitrogen in the solid layer of FeCoN has been found to be about the same as that in the gas. At the wafer level, the concentration of various elements can be determined by Auger Electron Spectroscopy (AES) or Electron Energy Loss Spectroscopy (EELS), while concentrations of various elements of a layer in a device such as a magnetic head can be determined by Transmission Electron Microscopy (TEM). The plot 60 has a peak saturation magnetization $B_S$ at about 1% nitrogen, with $B_S$ generally declining as the nitrogen content is increased above 1%. The coercivity generally increases as the nitrogen content of FeCoN layers declines from approximately 7%, however, arguing against the use of low nitrogen content FeCoN in magnetic heads. We have found that a coercivity as high as 30 Oe can be tolerated for high $B_S$ applications such as pole layers of magnetic heads, and so the nitrogen content of FeCoN layers for such high $B_S$ applications in which the FeCoN is interleaved with NiFe has been selected to be less than about 3%. A laminated structure having lower coercivity may be desirable for other applications such as soft magnetic underlayers for disks, in which having such a high $B_S$ may not be as critical as for pole tips.

The magnetically soft, high $B_S$ laminate 40 is well suited for use in a write pole tip for perpendicular recording. In this case, a laminated write pole layer may be formed entirely of alternating layers of FeCoN and NiFe having an overall thickness of about 3000 Å or less. The laminated write pole layer may be trimmed to have a trapezoidal cross-section, including a trapezoidal write pole tip. The laminated write pole layer does not appear to suffer from excessive magnetostriction, perhaps because it is encapsulated in other solid materials.

Figure 5:
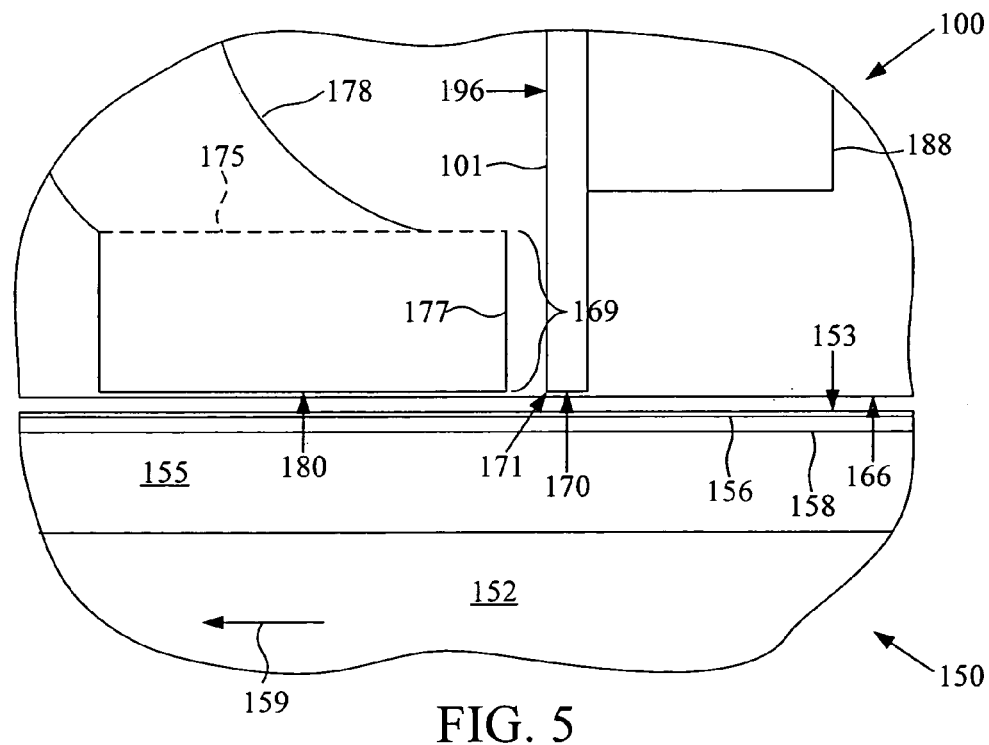
FIG. 5 is a cutaway cross-sectional view of a perpendicular recording transducer including the laminated structure of FIG. 2, in close proximity to a medium including a soft magnetic underlayer that may be formed of a similar laminate.

FIG. 5 is a cutaway cross-sectional view of a portion of a disk drive including a magnetic head 100 designed for perpendicular recording on a relatively moving medium 150. The head 100 includes a write pole layer 101 formed of interleaved layers of FeCoN and NiFe similar to that described above, formed to an overall thickness of about 2500 Å. The medium 150 includes a substrate 152 over which a soft magnetic underlayer 155 has been formed. The underlayer 155 may also be formed of interleaved layers of FeCoN and NiFe similar to that described above, although the atomic concentration of nitrogen in the FeCoN layers may be about 5%, instead of about 1% for the write pole 101. The underlayer may be thinner than is conventional for perpendicular media, for example, less than 500 nanometers, due to the relatively high $B_S$ of over 2.3 T.

A media layer 158 is disposed over the underlayer 155, the media layer having an easy axis of magnetization that is substantially perpendicular to a major surface 153 of the medium. A thin, physically hard overcoat 156 separates the media layer 158 from the medium surface 153. The medium 150, which may for example be a rigid disk, is moving relative to the head in a direction shown by arrow 159. The head 100 may be spaced from the medium 150 by a nanoscale air bearing, or the head may be in frequent or continuous contact with the medium during operation. The word nanoscale as used herein is meant to represent a size that is most conveniently described in terms of nanometers, e.g., between about one nanometer and about two hundred nanometers.

The head 100 has a medium-facing surface 166 disposed adjacent to the disk. The laminated write pole layer 101 terminates adjacent to the medium-facing surface in a first pole tip 170, which may sometimes be called a write pole tip. A soft magnetic layer 188 adjoins the write pole layer 101 but terminates further from the medium-facing surface 166 than the first pole tip 170, layers 101 and 188 combining to form a write pole. Another soft magnetic layer 178 is magnetically coupled to the write pole layer 101 in a region that is removed from the medium-facing surface and not shown in this figure, and is magnetically coupled to the write pole layer 101 adjacent to the medium-facing surface by a soft magnetic pedestal 175. The soft magnetic layer 178 and pedestal 175 may be considered to form a return pole layer that terminates adjacent to the medium-facing surface in a second pole tip 180. At least one electrically conductive coil section may be disposed between layers 101 and 178 and another coil section disposed upstream of layer 188, to induce magnetic flux in the pole layers.

Although not apparent in this view, the return pole tip 180 may have an area that is at least two or three orders of magnitude greater than that of the write pole tip 170. Alternatively, another return pole layer and return pole tip may additionally be provided, for example between the write pole layer and a MR sensor. The write pole tip 170 may have a substantially trapezoidal shape that has a maximum track width at a trailing corner 171. The trailing corner 171 of the write pole tip 170 may be approximately equidistant from soft magnetic underlayer 155 and soft magnetic pedestal 175 in this embodiment. The write pole layer 170 may have a $B_S$ that is between about 2.35T and 2.45T, while the soft magnetic pedestal 175 may have a $B_S$ that is substantially less, e.g., less than 2.0T.

Figure 6:
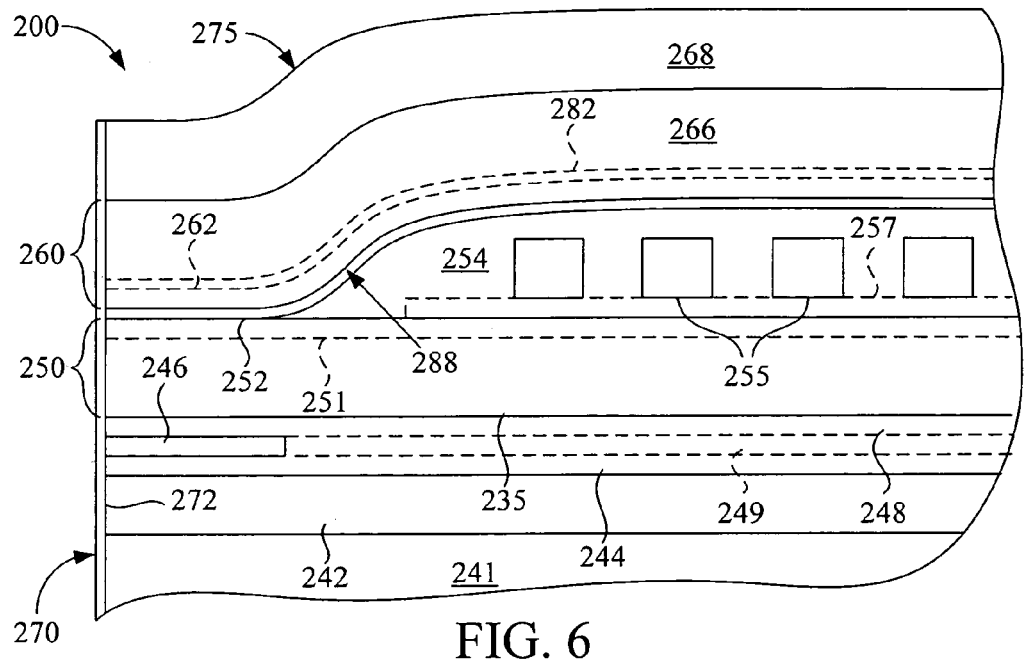
FIG. 6 is a cutaway cross-sectional view of a merged MR and longitudinal inductive transducer including a trailing pole layer electroplated atop a cap layer for the laminate of FIG. 2.

FIG. 6 is a cutaway cross-sectional view of a magnetic head 200 that can be used for longitudinal recording and which includes laminated high $B_S$ FeCoN/NiFe pole layers. As described below, the head 200 includes a merged magnetoresistive (MR) and inductive transducer, although the laminated high $B_S$ FeCoN/NiFe pole layers may instead be used for example in a separate inductive transducer, such as in a piggyback head, or in other applications in which magnetically soft, high $B_S$ materials are desirable.

The head 200 is formed on a wafer substrate 241, which may contain $Al_2O_3$, AlTiC, Si, SiC or other conventional materials. A first magnetically soft shield layer 242 is disposed atop the substrate 241. A first read gap layer 244 composed of electrically insulating, nonmagnetic material such as $Al_2O_3$ is disposed on shield layer 242. A MR sensor 246 is disposed atop the first read gap layer 244, and a second read gap layer 248 composed of electrically insulating, nonmagnetic material such as $Al_2O_3$ is disposed on the MR sensor. The MR sensor 246 may include a single layer of anisotropic magnetoresistive (AMR) material such as Permalloy, or the sensor may contain plural or multiple layers of sensor materials as is known to form a spin-valve sensor, giant magnetoresistive (GMR) sensor, dual stripe magnetoresistive (DSMR) sensor or other known types of sensing mechanisms. In other embodiments, such a MR sensor may be configured for current-perpendicular-to-plane (CPP) operation involving, for example, spin-dependent tunneling (SDT) or spin-valve sensors. The MR sensor 246 may be trimmed to leave an insulating layer 249 formed of a dielectric such as $Al_2O_3$ distal to a media-facing surface 270.

A second magnetically soft shield layer 250 is disposed atop the second read gap layer 248, the second shield layer also serving in this merged transducer as a first write pole layer 250. In an alternative embodiment, a first write pole is separated from the second shield layer. The layer 250 may be formed of an electroplated layer 235 of Permalloy or other materials having higher saturation magnetization, including magnetically soft, primarily-iron NiFe or FeXN, where X is an element such as Ta, Rh, Al, etc., or FeCoNi. Layer 235 may be electroplated and then polished to form a smooth surface, upon which a first laminated FeCoN/FeNi structure 251 can be formed. The laminated structure 251 includes layers of primarily-iron FeCoN interleaved with layers of FeNi, and provides a magnetically soft high moment material upon which a submicron nonferromagnetic gap layer 252 is formed. The gap layer 252 separates the first write pole 250 from a second write pole layer 260, and magnetic flux communicated between the pole layers 250 and 260 can fringe out from the gap layer to write magnetic pattern on an adjacent media.

A second laminated FeCoN/FeNi structure 262 is formed on the gap layer 252. The laminated structure 162 includes layers of primarily-iron FeCoN interleaved with layers of primarily-iron FeNi, and provides a second magnetically soft high moment layer adjoining the nonferromagnetic gap layer 152. Having the laminated FeCoN/FeNi structure 262 adjoining a trailing edge of the gap layer 252 allows sharply defined, high density magnetic patterns to be written onto an adjacent media. Materials from which gap layer 252 can be made include dielectric materials such as $Al_2O_3$ or $SiO_2$ or metals such as chromium, tantalum or nickel-niobium. The gap layer 252 can serve as a seed layer promoting favorable deposition of the laminated FeCoN/FeNi structure 262. The laminated FeCoN/FeNi structure 262 does not appear to suffer from excessive magnetostriction, perhaps because it is encapsulated in other solid materials.

An electrically conductive coil 255 is provided atop an insulating layer 257 to induce magnetic flux in the pole layers 250 and 260 for writing signals to a medium. The coil 255 is encircled by baked photoresist 254 that provides insulation between coil sections and also provides a sloped surface that allows the pole layers 250 and 260 to be separated by several microns adjacent the coil 255 and less than two hundred nanometers adjacent the media-facing surface 270. In another embodiment, a second pole layer can be substantially flat, with the magnetic core brought close to the gap by an additional magnetic layer, which may be termed a pedestal, adjoining either or both of the pole layers. In yet another embodiment, such a pedestal can be formed adjoining a second pole layer that curves in a similar fashion as pole layer 260, with the pedestal and pole layer stitched together adjacent to the media-facing surface 270. In any of these embodiments, the write pole tip adjoining the trailing portion of the gap can be made of laminated FeCoN, and may have a track-width dimension of less than 200 nm.

The second laminated FeCoN/FeNi structure 262 is formed in a plurality of DC magnetron sputtered layers, beginning with NiFe having an atomic concentration of both nickel and iron in a range between about 30% and 70%, which may be formed to a thickness of 20 Å–30 Å. Alternatively, for the situation in which the gap layer 252 is made of Cr or NiNb, the initial layer of the laminated FeCoN/FeNi structure 262 may be formed of primarily-iron FeCoN. After formation of at least three layers of the primarily-iron FeCoN interleaved with at least three layers of the FeNi, a cap layer 282 of FeCoNi may be formed by RF sputtering atop the laminated structure 262. A layer 266 of FeCoNi having atomic concentrations of elements that are substantially identical to that of the cap layer 282 may then be formed by electroplating. The cap layer 282 may be denser and less subject to corrosion than the than the laminated FeCoN/FeNi structure 262 of CoNiFe, particularly in a sloped region 288 of the pole layer 260, where the laminated structure 282 may be more porous and defect prone. Having a cap layer formed of a similar concentration of metals as the electroplating solution may also help to avoid chemical reactions that may otherwise remove parts of the laminated structure 282.

Alternatively, pole layer 260 may be formed entirely of a magnetically soft laminated FeCoN/FeNi structure having high saturation magnetization, which may be feasible due to the relatively high deposition rate of magnetron sputtering, so that for example a laminated structure a few microns in thickness can be formed in less than one hour.

After formation of second pole layer 260, that layer may be masked and trimmed by a directional etching process such as ion beam etching (IBE) to define a trailing pole tip. The etching may be designed to also cut into the first pole layer 250, creating a leading pole tip that is aligned with the trailing pole tip. A protective coating layer 268 of $Al_2O_3$, diamond like carbon (DLC) or other hard materials is then formed on what will become a trailing end 275 of the head, after which the wafer substrate 241 and transducer layers are diced into thousands of heads. A protective coating 272 has also been formed on the media-facing surface 270 of the transducer. The media-facing surface 270 is formed along one die edge. Note that the MR sensor 246 may alternatively be formed after the formation of the inductive core that includes write poles 250 and 260, affording higher temperature processing of the write poles. In an alternative embodiment, sensing is performed inductively with the same transducer elements that are used to write magnetic patterns on the media, without the need for a MR sensor.

Figure 7:
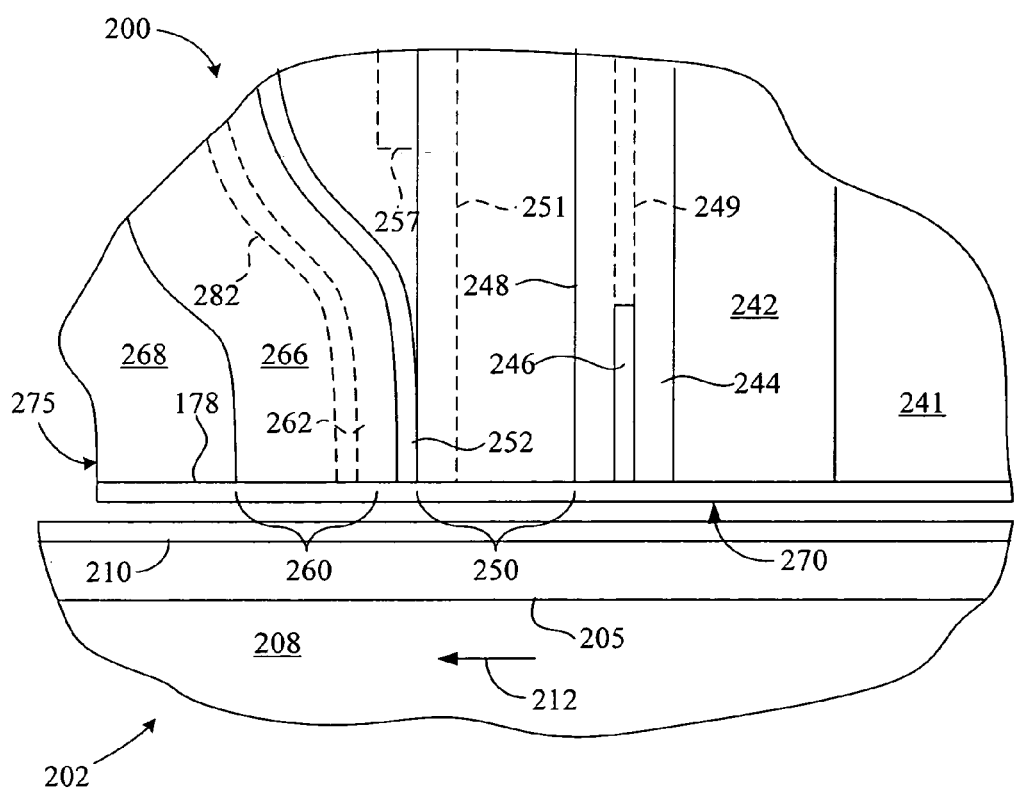
FIG. 7 is a cutaway cross-sectional view of the transducer of FIG. 6 disposed in close proximity to a medium.

FIG. 7 shows the merged transducer 200 disposed in close proximity to a medium 202 which is moving relative to the head as shown by arrow 212, from a leading end to the trailing end 275 of the head. The media 200 may be a disk or tape, for example, which includes a media layer or layers 205 disposed atop a substrate 208, with an overcoat layer 210 protecting the media layer 205. The write poles 250 and 260 form a magnetic circuit or loop to encourage the flow of magnetic flux across the write gap layer 252. An electrical current flowed through the coil 255 induces a magnetic flux in the write layers that fringes out from the nonferromagnetic gap layer 252 to write a magnetic bit in the media layer 205. The MR sensor 246 can read magnetic bits that have been written on the media.

Although the present disclosure has focused on teaching the preferred embodiments, other embodiments and modifications of this invention will be apparent to persons of ordinary skill in the art in view of these teachings. For example, the primarily-iron laminates of FeCoN/FeNi can be employed in various devices that benefit from high saturation magnetization, magnetically soft materials, such as magnetic sensors, magnetic force microscopes, magnetic switches, etc. Therefore, this invention is to be limited only by the following claims, which include all such embodiments and modifications when viewed in conjunction with the above specification and accompanying drawings.

The invention claimed is:

1. A magnetic head comprising:
    a first layer containing $Ni_XFe_{(1-X)}$, wherein $0.3 \leq X \leq 0.7$;
    a second layer containing $Fe_YCo_ZN_{(1-Y-Z)}$, wherein $0.5 \leq Y \leq 0.8$ and $0 < (1-Y-Z) \leq 0.03$, and the second layer adjoins the first layer; and
    a third layer containing $Fe_ACo_BNi_{(1-A-B)}$, wherein $0.6 \leq A \leq 0.7$, $0.1 \leq (1-A-B) \leq 0.08$ and the third layer adjoins only one of the first and second layers.

2. The head of claim 1, wherein the second layer is more than ten times thicker than the first layer.

3. The head of claim 1, wherein the second layer is more than twenty times thicker than the first layer.

4. The head of claim 1, wherein the first and second layers have a combined thickness of less than one hundred nanometers.

5. The head of claim 1, wherein the first and second layers are part of a laminate that contains a plurality of adjoining pairs of layers, each of the pairs being substantially identical to the first and second layers.

6. The head of claim 1, further comprising a plurality of pairs of layers that are stacked atop the pair of first and second layers, each of the plurality of pairs of layers being substantially identical to the pair of first and second layers.

7. The head of claim 1, further comprising a fourth layer containing $Fe_ECo_FNi_{(1-E-F)}$, wherein $0.6 \leq E \leq 0.7$, $0.1 \leq (1-E-F) \leq 0.08$ and the third layer adjoins the fourth layer and one of the first and second layers.

8. The head of claim 7, wherein A is approximately equal to E, and B is approximately equal to F.

9. The head of claim 1, wherein the first, second and third layers are each nonplanar.

10. The head of claim 1, wherein the first, second and third layers are part of an inductive transducer.

11. The head of claim 1, wherein the first and second layers have a combined saturation magnetization of at least 2.4 tesla.

12. The head of claim 1, wherein the first and second layers have a combined coercivity of not more than thirty oersted along a hard axis of magnetization.

13. A magnetic head comprising:
    a first layer containing NiFe having an atomic concentration of iron that is at least thirty percent and not more than seventy percent;
    a second layer that adjoins the first layer and contains FeCoN having an atomic concentration of iron that is greater than the second layer's atomic concentration of cobalt, having an atomic concentration of nitrogen that is less than the second layer's atomic concentration of cobalt and less than three percent; and a third layer containing FeCoNi having an atomic concentration of nickel that is less than eight percent, having an atomic concentration of cobalt that is less than the third layer's atomic concentration of iron and greater than the third layer's atomic concentration of nickel, the third layer adjoining only one of the first and second layers.

14. The head of claim 13, wherein the second layer is more than ten times thicker than the first layer.

15. The head of claim 13, wherein the second layer is more than twenty times thicker than the first layer.

16. The head of claim 13, wherein the first and second layers have a combined thickness of less than one hundred nanometers.

17. The head of claim 13, wherein the adjoining pair of first and second layers are part of a laminate that contains a plurality of adjoining pairs of first and second layers.

18. The head of claim 13, further comprising a plurality of pairs of layers that are stacked atop the pair of first and second layers, each of the plurality of pairs of layers being substantially identical to the pair of first and second layers.

19. The head of claim 13, further comprising a fourth layer containing FeCoNi, wherein the third layer adjoins the fourth layer and one of the first and second layers.

20. The head of claim 19, wherein the fourth layer has relative concentrations of elements that are approximately equal to that of the third layer.

21. The head of claim 13, wherein the first, second and third layers are each nonplanar.

22. The head of claim 13, wherein the first, second and third layers are part of an inductive transducer.

23. The head of claim 13, wherein the first and second layers have a combined saturation magnetization of at least 2.4 tesla, and a combined hard axis coercivity of not more than thirty oersted.

24. A magnetic head comprising:
a first plurality of layers each containing NiFe having an atomic concentration of iron that is at least about thirty percent;
a second plurality of layers that is interleaved with the first plurality of layers, the second plurality of layers each containing FeCoN having an atomic concentration of iron that is greater than an atomic concentration of cobalt, and having an atomic concentration of nitrogen that is less than the atomic concentration of cobalt, the atomic concentration of nitrogen being less than eight percent; and
a layer containing FeCoNi that adjoins one of the layers containing NiFe or one of the layers containing FeCoN.

25. The head of claim 24, wherein each of the layers containing FeCoN is more than ten times thicker than each of the layers containing NiFe.

26. The head of claim 24, wherein each of the layers containing FeCoN is at least twenty times thicker than each of the layers containing NiFe.

27. The head of claim 24, wherein at least one of the layers containing FeCoN has a thickness that is less than thirty angstroms, and wherein at least one of the layers containing NiFe has a thickness that is greater than four hundred angstroms.

28. The head of claim 24, further comprising a second layer containing FeCoNi that does not adjoin any of the layers containing FeCoN and does not adjoin any of the layers containing NiFe.

29. The head of claim 28, wherein the layer containing FeCoNi has a relative concentration of elements that are approximately equal to that of the second layer containing FeCoNi.

30. The head of claim 28, wherein the layer containing FeCoNi has been formed by physical vapor deposition, and the second layer containing FeCoNi has been formed by electroplating FeCoNi.

31. The head of claim 24, wherein the layer containing FeCoNi is nonplanar.

32. The head of claim 24, wherein the interleaved first and second pluralities of layers have a combined saturation magnetization of at least 2.4 tesla, and a combined hard axis coercivity of not more than thirty oersted.

33. The head of claim 24, wherein the layer containing FeCoNi is sputtered, and further comprising a second layer containing FeCoNi that is electroplated, does not adjoin any of the layers containing FeCoN and does not adjoin any of the layers containing NiFe.

34. A disk drive comprising:
a disk including a magnetic media layer; and
a magnetic head including:
a first layer containing $Ni_XFe_{(1-X)}$, wherein $0.3 \leq X \leq 0.7$;
a second layer containing $Fe_YCo_ZN_{(1-Y-Z)}$, wherein $0.5 \leq Y \leq 0.8$ and $0 < (1-Y-Z) \leq 0.03$, and the second layer adjoins the first layer; and
a third layer containing $Fe_ACo_BNi_{(1-A-B)}$, wherein $0.6 \leq A \leq 0.7$, $0.1 \leq (1-A-B) \leq 0.08$ and the third layer adjoins only one of the first and second layers.

35. The disk drive of claim 34, wherein the second layer is more than ten times thicker than the first layer.

36. The disk drive of claim 34, wherein the second layer is more than twenty times thicker than the first layer.

37. The disk drive of claim 34, wherein the first and second layers have a combined thickness of less than one hundred nanometers.

38. The disk drive of claim 34, wherein the first and second layers are part of a laminate that contains a plurality of adjoining pairs of layers, each of the pairs being substantially identical to the first and second layers.

39. The disk drive of claim 34, further comprising a plurality of pairs of layers that are stacked atop the pair of first and second layers, each of the plurality of pairs of layers being substantially identical to the pair of first and second layers.

40. The disk drive of claim 34, further comprising a fourth layer containing $Fe_ECo_FNi_{(1-E-F)}$, wherein $0.6 \leq E \leq 0.7$, $0.1 \leq (1-E-F) \leq 0.08$ and the third layer adjoins the fourth layer and one of the first and second layers.

41. The disk drive of claim 40, wherein A is approximately equal to E, and B is approximately equal to F.

42. The disk drive of claim 34, wherein the first, second and third layers are each nonplanar.

43. The disk drive of claim 34, wherein the first, second and third layers are part of an inductive transducer.

44. The disk drive of claim 34, wherein the first and second layers have a combined saturation magnetization of at least 2.4 tesla.

45. The disk drive of claim 34, wherein the first and second layers have a combined coercivity of not more than thirty oersted along a hard axis of magnetization.

* * * * *